Aug. 20, 1963
R. H. VARIAN
3,101,469
PHASE COHERENT RADAR SYSTEM
Filed May 28, 1953
3 Sheets-Sheet 1
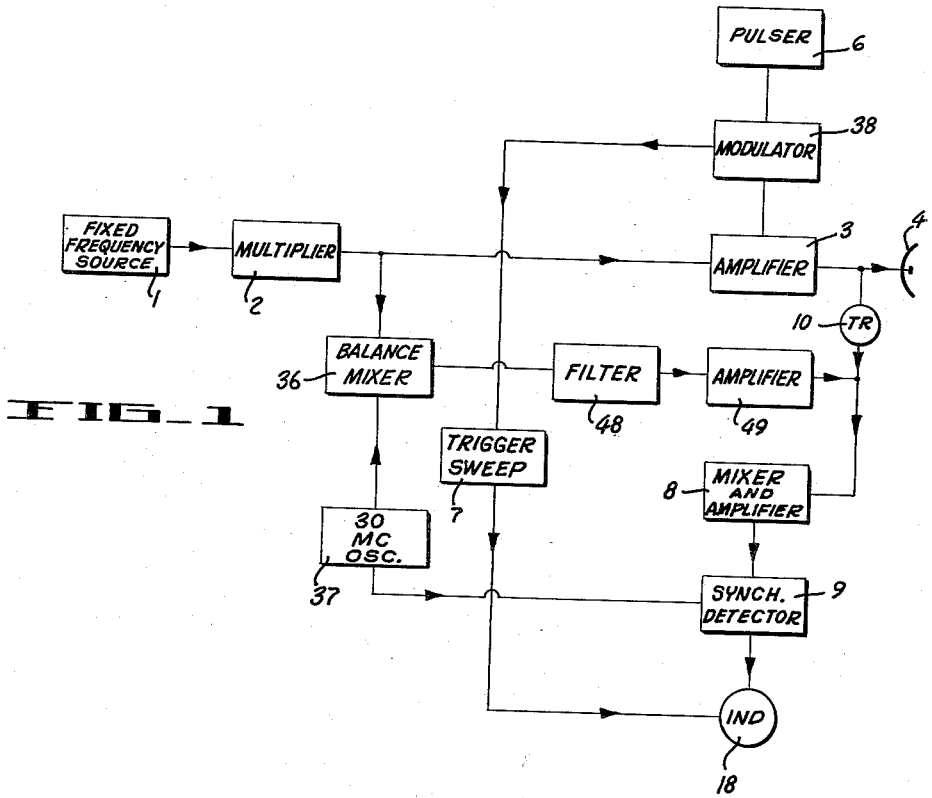
FIG_1
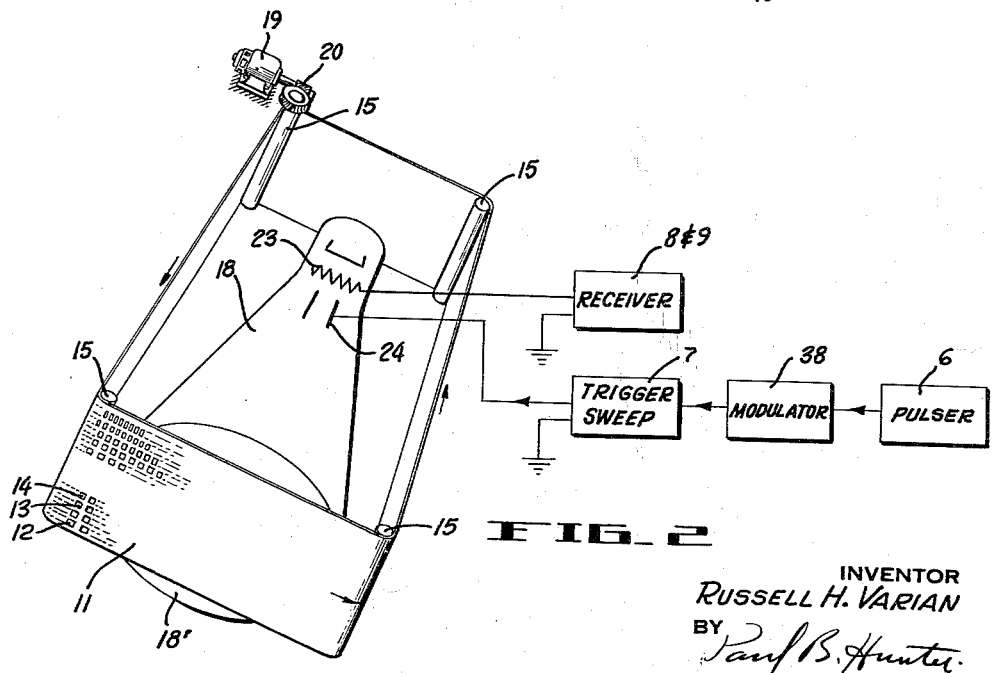
FIG_2
INVENTOR
RUSSELL H. VARIAN
BY
*Paul B. Hunter*
ATTORNEY Aug. 20, 1963　　　　　R. H. VARIAN　　　　3,101,469
PHASE COHERENT RADAR SYSTEM
Filed May 28, 1953　　　　　　　　　　　　3 Sheets-Sheet 2
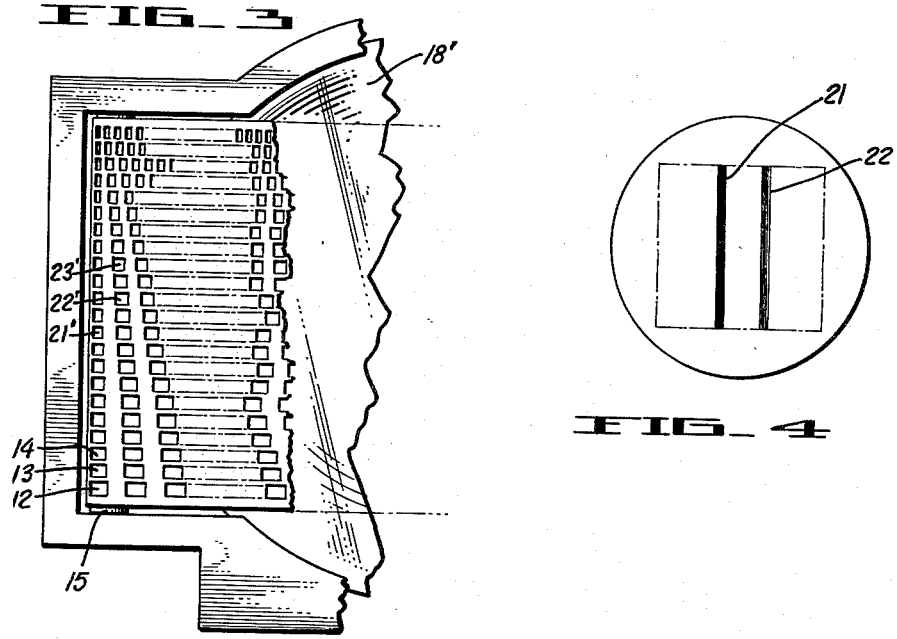
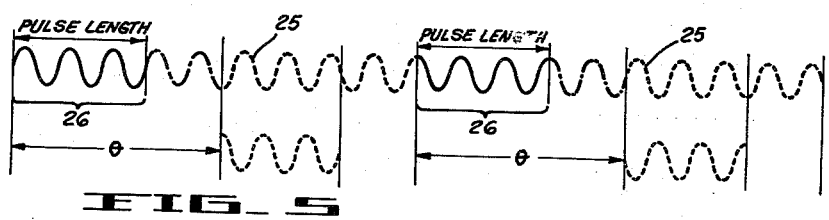
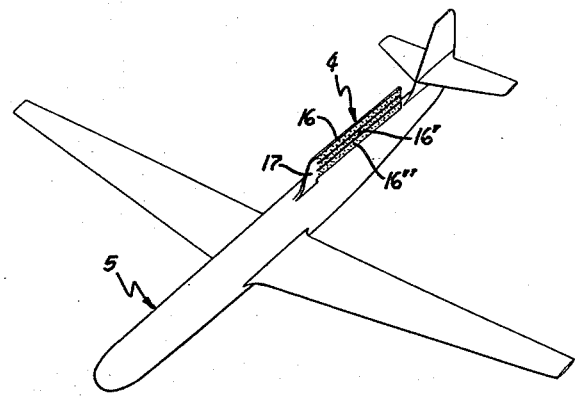
INVENTOR
RUSSELL H. VARIAN
BY
Paul B. Hunter
ATTORNEY Aug. 20, 1963  R. H. VARIAN  3,101,469
PHASE COHERENT RADAR SYSTEM
Filed May 28, 1953  3 Sheets-Sheet 3
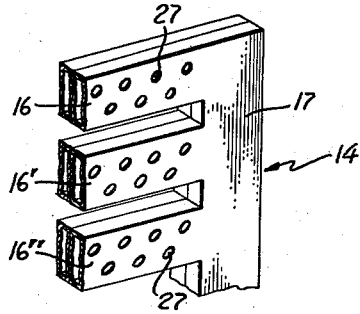
FIG_6a
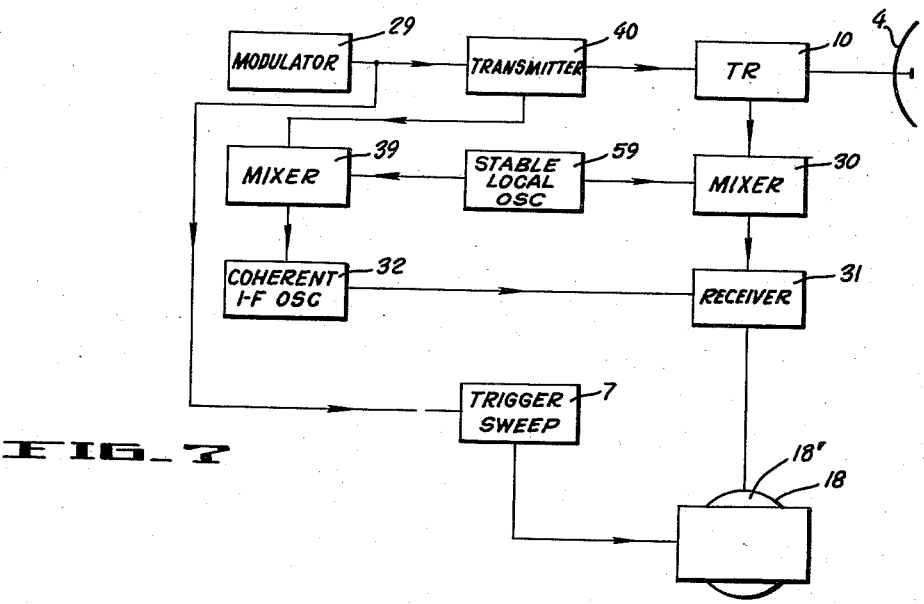
FIG_7
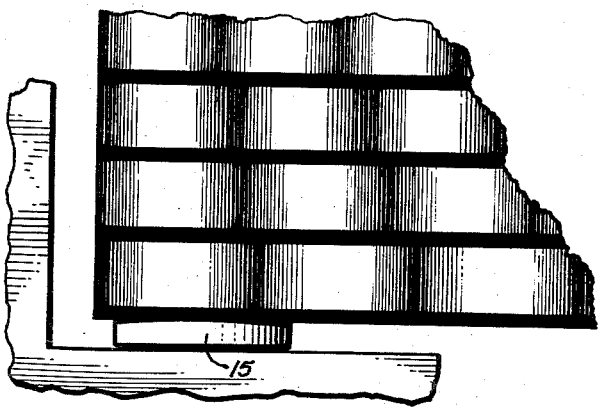
FIG_8
INVENTOR
RUSSELL H. VARIAN
BY
ATTORNEY

United States Patent Office 3,101,469
Patented Aug. 20, 1963

3,101,469
PHASE COHERENT RADAR SYSTEM
Russell H. Varian, Cupertino, Calif., assignor to Varian Associates, San Carlos, Calif., a corporation of California
Filed May 28, 1953, Ser. No. 357,965
10 Claims. (Cl. 343—9)

The present invention relates in general to radar systems and the invention has reference, more particularly, to a novel microwave phase coherent radar system especially suitable for detecting targets such as snorkelized submarines where there is considerable sea return or clutter, said system being also suitable for locating moving targets on land such as trains, convoys or other military movements.

The radar systems heretofore used for detecting submarines or other moving objects or targets generally use a moving scan system such as a slow scan system or a rapid scan system, the rapid scan system being better than the slow scan system mainly because a better sample of the echo data is attained. Sea return has statistical properties similar to receiver noise, and therefore the ideal type of sampling is a continuous integration over the entire time the target or object is in view. However, samples, or looks, can be taken less frequently with very little loss in target to sea return ratio, provided the time between looks is short compared to the correlation time of the sea return. The rapid scan system does not quite meet this condition with a scan rate of around 20 scans per sec., and the slower scanning systems fall very far short of this condition. Hence, the rapid scan system is a considerable improvement over the systems previously in use.

However, an appreciable portion of the energy components of sea return are contained in frequencies below 10 cycles so that a 20 cycle scan rate is therefore approximately 40% as efficient as continuous observation. Further, the rapid scan system has serious limitations as compared to a continuous sampling system as provided by the present invention in that the rapid scan system has a relatively small antenna area whereas in using the system of the present invention a larger, side-observation antenna can be employed so that it is possible to attain many times the sensitivity possible with the rapid scan system.

It is, therefore, the principal object of the present invention to provide a novel microwave phase coherent radar system which enables a continuous sampling of the returning signal over the entire time that the target or object is in view, said novel system employing an antenna of large aperture and providing both Doppler and range information.

Another object of the present invention is to provide a novel radar system of the above character having greatly increased sensitivity over systems heretofore used, the said system providing a much improved ratio of target to sea return and enabling a greatly increased search range permitting search to extend over entire oceans.

Still another object of the invention is to provide a radar system of the above character having a novel display system employing a scanning belt in conjunction with a cathode ray indicator, whereby system sensitivity is increased and range information along with Doppler information is provided to clearly eliminate confusion which would otherwise result from fake snorkels and flotsam.

Other objects and advantages will become apparent as the description proceeds.

In order that the advantages of the present invention may be fully appreciated, it should be borne in mind that the ratio of target return to sea return increases as the horizontal aperture of the radar antenna is increased, and as the pulse length is decreased. Thus, if the antenna dimensions are increased to the maximum size compatible with aircraft dimensions, sea return will no longer be a serious problem, even with very rough seas. Generally power levels and bandwidths are such that the snorkelized submarine will ordinarily be unable to detect radiation from the minor lobes of the searching aircraft. Hence, usually the submarine will not know that it is being searched for until it is covered by the main lobe of the aircraft search pattern, at which time it will be too late to submerge before detection.

Sea return is proportional to the area of sea illuminated at one time because of the presence of a large number of reflecting points distributed randomly over the surface of the sea. The total reflection, proportional to the number of points illuminated, is likewise proportional to the area A of the sea illuminated. The target return is independent of A and hence the ratio of target to sea return is proportional to $1/A$. A is proportional to $\phi l$ where $\phi$ is the angular width of the beam and $l$ is the distance over which a single pulse extends. The radar array should preferably have the greatest possible lateral extent and the pulse length should be as short as possible, to obtain the best ratio of target to sea return. The greatest lateral extent of the array is attained only if conventional mechanical scanning is given up and scanning is obtained by forward motion of the aircraft itself.

It can be shown mathematically that $$\frac{Pr'}{Pr} = \frac{WS'}{1.2\lambda R l S^0}$$

where $Pr'$ is the return power from the target, $Pr$, is the return power from sea echo, $W$ is the width of the antenna, $S'$ is the effective reflecting area of the target, $\lambda$ is the wavelength, $R$ is the range, $l$ is the pulse length, and $S^0$ is the reflection per unit area of the sea relative to perfect reflection.

For the very roughest seas and for a 1° angle of incidence $S^0$ lies between $-40$ and $-30$ db below a perfect reflector. By substituting this value in the above equation, and assuming the use of a large airplane where $W$ may be $5\times10^3$ cm., a $10^{-7}$ sec. pulse length and a snorkel scattering area of 1 sq. meter, and $\lambda=10$ cm., we find that for the roughest seas the range where the sea return and target return are of equal intensity is from 30 km. to 300 km. At larger ranges the sea return would be larger, except that at long range the angles of incidence will be less than 1° if the aircraft is at a suitable altitude. Sea return drops off rapidly below 1° so that at long ranges sea return is never a factor. Sea return has statistical properties similar to receiver noise, and therefore the ideal type of sampling is a continuous integration over the entire time the target or object is in view. The system of the present invention being a continuous sampling system gains a considerable factor over any existing system.

Referring now to the drawings:

FIG. 1 is a block diagram illustrating one form of the novel phase coherent radar system of this invention.

FIG. 2 shows the indicator of FIG. 1 in some detail together with connected circuit members.

FIG. 3 is a partial front elevational view of the indicator.

FIG. 4 shows the front of the indicator tube with the scanning belt removed and illustrates typical indications.

FIG. 5 is a diagram illustration of the phase coherent action of the system.

FIG. 6 is a perspective view of an aircraft equipped with the apparatus of this invention.

FIG. 6(a) is a fragmentary detail view of the antenna structure.

FIG. 7 illustrates a slightly modified system, and

FIG. 8 illustrates a modified indicator screen.

Similar characters of reference are used in all of the above figures to indicate corresponding parts.

In FIG. 1 is shown a fixed frequency source 1 such as a crystal controlled oscillator, the output frequency of which is multiplied in a multiplier 2 up to a suitable ultra high frequency as by use of klystron amplifiers such that the output will be suitable for directive radiation such as, for example, a frequency of 3000 megacycles. The output of multiplier 2 is fed to amplifier 3 controlled from pulser 6 and from thence this output is fed to the antenna array 4 in pulses. Actually this antenna array 4 has a large horizontal extent and a reasonable extent in the vertical direction such as is shown in FIG. 6. Preferably the airplane 5 is a large plane such as a B-36 or a Constellation with a high dorsal fin so as to accommodate the relatively long antenna. Such an antenna will attain scanning distances of beyond 100 miles. The antenna 4 is preferably rather wide, and this antenna can, for example, consist of a series of waveguides 16, 16' and 16" fed from an input guide 17, said guides being provided with staggered emitting apertures or horns 27 as shown in FIG. 6(a), the emission from these various apertures or horns serving to produce interference patterns which result in a sharp transverse beam of long range.

It is preferable that the airplane 5 be carefully gyrostabilized for satisfactory operation and should have a speed such that the object searched for such as a submarine snorkel will be in view for a few seconds at 100 miles distance. The plane can also fly at a high altitude which will aid in stabilizing the same and is able to pick up targets at great distance. The amplifier 3 which may be of the klystron type is pulsed regularly at a repetition rate, for example, of 500 c.p.s. by the pulser 6 while the pulse duration determined by modulator 38 may be of the order of $10^{-7}$ seconds. Pulser 6 acting through modulator 38 also intermittently energizes a trigger sweep 7 which in turn produces the range sweep for a cathode ray indicator 18. The returning signal of the object or the target is picked up by antenna 4, fed through TR box 10 to mixer and amplifier 8 wherein this returning signal is mixed with frequencies corresponding to the carrier frequency plus and minus 30 mc., for example, supplied from mixer 36. Mixer 36 mixes signals from multiplier 2 and oscillator 37 which may have a suitable frequency of 30 mc., for example. Any other source of stable frequency may be substituted for source 1 and multiplier 2.

The result of the mixing in mixer 36 is the original carrier frequency such as 3000 mc. plus and minus 30 mc. supplied from oscillator 37. The 30 mc. frequency will be very weak since it is highly attenuated in a filter 48. The two sideband frequencies which may be amplified by an amplifier 49 are mixed with the reflected signal and amplified in mixer and amplifier 8. It is clear that sum and difference frequencies of all the frequencies will result. If we assume that the signal reflected from the target has been Doppler shifted, we have four frequencies being mixed in mixer and amplifier 8. The two sidebands at plus and minus 30 mc. will when mixed with the carrier produce 30 mc. This must not be greater than the reflected signal. The two 30 mc. sidebands will mix with each other to produce 60 mc. which will be rejected by the R.F. amplifier. The reflected signal, being Doppler shifted, will beat with the original carrier to produce an audio Doppler frequency which will be negligibly weak. It will also produce difference frequencies with each of the 30 mc. sideband frequencies. Since the Doppler shifted frequency is closer to one sideband than to the other, there will be two different frequencies, one being 30 mc. plus the Doppler frequency, and the other 30 mc. minus the Doppler frequency. The original 30 mc. from oscillator 37 can then be reintroduced in proper phase in synchronous detector 9 to produce a Doppler signal resulting from the product of 30 mc. plus Doppler times 30 mc. and 30 mc. minus Doppler times 30 mc.

This system has the merit of relative simplicity combined with the advantage that both image sidebands are used so the signal to noise ratio is as good as though R.F. amplification were used ahead of the first detector. This is an improvement of 2-1 over standard radars. The output of detector 9 is supplied to the intensity grid of the indicator 18.

Indicator 18 is shown in detail in FIG. 2 and consists of a cathode ray oscillograph which produces a vertical long line image on the screen instead of a spot image. Since there exists the possibility of trouble resulting from fake snorkels, it is essential that both Doppler and range information should be supplied. This is accomplished through use of the phase coherent pulse system of this invention. A pulse system which puts only one pulse on a target is in most cases severely limited in average power because it is limited to a low pulse repetition rate and existing pulse tubes are limited in peak power on the pulse and also in energy deliverable in a single pulse. Such a system is also limited in that it does not give Doppler information. The pure Doppler system is also limited in application because it gives no range information and also cannot derive the benefit of the small area of sea looked at as is possible with a short pulse system. Hence, most generally useful systems suffer a moderate to severe loss in sensitivity per unit of average power when known display methods are used. This is because a coherent pulse system transmits a signal which is coherent over many pulses and the signal reflected from a target having a uniform relative motion with respect to the transmitter is equally coherent. The coherence is not the same, however, because of the Doppler effect associated with the moving target and the Doppler shift is in general unpredictable, and the display which is to give greatest sensitivity must be capable of simultaneously displaying all possible Doppler shifts and all possible ranges. Heretofore, it has been impossible to produce this result so that the coherence between pulses was not used.

In the system of the present invention radial velocity information and range information are obtained simultaneously so that the sensitivity of the system is greatly increased and this is accomplished by use of a moving screen 11 (see FIG. 2) which may be in the form of a flexible ribbon such as of steel or other metal or material having many rows of holes or windows 12, 13, 14, etc. therein arranged to extend horizontally. The holes are preferably of rectangular shape and the space between these successive holes of any row is equal to the width of the holes. The width of the holes and intervening spaces vary gradually from one row to the next so that the widest holes 12 are along the lower edge of the belt and the narrowest holes are near the upper edge of the belt, although this arrangement can be reversed, if desired. The best arrangement is actually not transparent holes in an opaque medium, but sinusoidal variations in photographic density such as a transparent plastic belt provided with rows of alternate transparent and opaque portions, the portions of a row merging together in a sinusoidal manner, and the spacing between alternate transparent and opaque portions varying progressively from row to row from one side of the belt to the other as shown in FIG. 8.

The moving screen or belt 11 is mounted on pulleys 15 and is driven so as to move continuosuly in front of the face 18' of indicator 18 from left to right as viewed in FIG. 2. A motor 19 operates through gearing 20 to drive the belt 11. Thus the belt 11 as it moves across the face of tube 18 provides a multiplicity of shutters operated over the entire illuminated area of the cathode ray screen. All illuminated parts of the screen are covered and in a direction perpendicular to the scan there exists a continuous graduation of shutter speeds to nearly coincide with all possible Doppler frequencies. If, for example, a particular shutter speed corresponds to the Doppler frequency of a target it rectifies the light fluctuation and a light or dark spot is seen. If the shutter speed is not just right, a continuously fluctuating light is seen, fluctuating at a rate slow enough to be observed in spite of the persistence of vision. Thus the direction of sweep represents range as usual as in the ordinary A scope and the perpendicular distance represents Doppler shift. Thus, should the pulse repetition rate be 500 c.p.s., for example, several hundred graduations in Doppler frequency can be made. This in effect gives a great decrease in pre-detection bandwidth and hence a large improvement in receiver sensitvity perhaps by a factor of 10 or 20. The ratio of signal to sea return can be increased by a somewhat smaller amount, because there is a certain amount of coherence in sea return over an interval of 1/500 second.

The cathode ray tube over which the belt, previously described, passes is of special construction. Instead of forming a spot image as is the case with most cathode ray tubes, a vertical line image is formed and this line image is then swept perpendicular to its length in a typical A scope scan. Provision is made to intensity modulate the cathode ray beam in accordance with the radar signal by applying the signal from receiver 8, 9 to intensity grid 23. The intensity bias is set in the middle of the intensity range so that any sinusoidal fluctuation of the signal will produce an intensity change which averages to zero.

The scope when viewed with the unaided eye as is shown in FIG. 4 will not indicate targets except when the Doppler frequency is below the frequency associated with the persistance of vision. Thus, as shown in FIG. 4, dark line 21 and light line 22 show targets separated in range which targets are fixed. This will be apparent through examination of FIG. 5 wherein 25 designates the carrier output of multiplier 2 while a portion of the carrier embraced by brackets 26 indicate the pulse length of pulses emitted by antenna 4. When the reflected pulses are received from a stationary object the intensity of the line drawn on the screen such as lines 21 and 22 depends upon the phase of the returning signal. If this phase is similar to the phase supplied to the receiver 8, 9 from the multiplier 2 the added signals serve to draw a bright line such as 22 upon the instrument face, whereas if these signals are of opposed phase they are subtracted so that a dark line such as 21 will appear on the face of the tube. Where there is Doppler shift the lines will ordinarily be light and dark depending on the continuous phase relations of the signal with respect to the heterodyning frequency. If there is a Doppler shift, the frequency of fluctuation of the line is the measure of the Doppler frequency and by use of the screen 11 of FIG. 2 the Doppler frequency and hence the radial velocity of the target can be readily determined by picking out that row such as 12, 13 and 14 of holes wherein the light remains of uniform intensity and does not flicker. Each row of holes corresponds to a certain Doppler frequency and can be marked, if desired, so as to indicate the actual radial velocity of the target. In FIG. 2 the receiver is shown connected to the intensity grid 23 while the trigger sweep is shown connected to the horizonal deflector plates 24.

A somewhat modified form of circuitry is shown in FIG. 7 wherein a pulse duration modulator 29 is shown connected to control the output of the free running carrier frequency source or transmitter 40 so that the output signal is modulated at this frequency, the returning signal modulated by a Doppler frequency, if any, being mixed in the mixer 30 along with a stable frequency from oscillator 59 and the resulting sidebands, i.e., the 30 megacycle modulation plus or minus the Doppler frequency is supplied to receiver 31 and detected before being applied to the intensity grid of the indicator 18. Coherence between the echo signal and a reference signal is obtained by use of a coherent I.F. oscillator 32 whose phase is locked by mixer 39 supplied from transmitter 40 and stable local oscillator 59, said oscillator 32 supplying receiver 31 with the desired reference signal.

Since many changes could be made in the above construction and many apparently widely different embodiment of this invention could be made without departing from the scope thereof, it is intended that all matter contained in the above description or shown in the accompanying drawings shall be interpreted as illustrative and not in a limiting sense.

What is claimed is:

1. A radar system for detecting objects comprising transmitter means for transmitting a phase coherent pulse signal at carrier frequency, said signal being coherent over a multiplicity of transmitted pulses, a local oscillator, a balanced mixer connected for mixing the carrier signal from said transmitter means with the output for said local oscillator to produce two frequencies which are each displaced a fixed amount from the original carrier frequency thereby enhancing the signal-to-noise ratio, receiver means for receiving reflected signals from targets and for mixing said return signals with the output of said balanced mixer, and amplifying said mixed signals, means for detecting the amplified signals, and a multiple object indicator connected for receiving such signals and indicating range information and a quantitative measurement of the relative velocity of the objects viewed with respect to the transmitting station on differing axes respectively.

2. A radar system as defined in claim 1 wherein said indicator comprises a cathode ray tube, a multi-windowed screen, and motor means for moving said screen over the face of said tube, the windows of said screen cooperating with the tube indications to provide radial velocity and range information.

3. A radar system comprising a wide side-looking antenna mounted on a moving vehicle, means for energizing said antenna with repetitious signals of short pulse length at carrier frequency, the forward motion of the vehicle providing the scanning of objects by forward movement of the main lobe of radiation from said antenna, a local oscillator, a balanced mixer connected for mixing the carrier signal from said energizing means with the output from said local oscillator to produce two frequencies which are displaced a fixed amount from the original carrier frequency, a receiver for receiving reflected signals, said receiver having a mixer for mixing the same with the output of said balanced mixer consisting of two frequencies displaced a fixed amount from the original carrier frequency thereby enhancing the signal-to-noise ratio, said receiver having a detector for detecting said mixed signals, and a dual indicator controlled from said receiver for indicating both range and a quantitative measurement of Doppler formation.

4. A radar system as defined in claim 3 wherein the repetitious signals are phase coherent whereby the reflected signals from an object are also coherent enabling an integration of said reflected signals over the entire time the object is in view.

5. A radar system as defined in claim 3, wherein said indicator comprises a cathode ray tube provided with a transversely moving screen, said screen having a plurality of rows of mutually spaced holes, the size of the holes and their spacing progressively decreasing from row to row.

6. A radar system as defined in claim 3, wherein said indicator comprises a cathode ray tube provided with a transversely moving screen, said screen having a plurality of rows of mutually spaced alternate transparent and opaque portions, said portions varying from opaqueness to transparency in a substantially sinusoidal manner, the spacing between alternate transparent and opaque portions varying from row to row progressively from one side of the screen to the other.

7. A radar system for detecting and indicating one or more objects simultaneously from a moving vehicle comprising an antenna fixed on the vehicle and having a wide horizontal aperture, means supplying said antenna with pulsed signals at carrier frequency, means for receiving reflected signals and for detecting Doppler shift, and an indicator comprising a cathode ray tube and a multi-apertured screen movable over the face of said tube connected for indicating range and relative radial velocity of the object or objects.

8. A radar system as defined in claim 7 wherein said signal supplying means comprises a free running carrier frequency source and said receiving and detecting means comprises, a stable frequency source, a mixer for mixing the returning signal with the stable frequency from said source, a second mixer supplied from said carrier frequency source and said stable frequency source, and a coherent oscillator connected with said second mixer to be locked in phase therewith for supplying a receiver reference signal.

9. A radar system as defined in claim 7 wherein said signal supplying means comprises a fixed high frequency carrier source, a pulser for controlling the modulated output of said source, and said receiving and detecting means comprises, a radio frequency oscillator, a mixer for mixing said oscillator output with the output of said carrier source, filter and amplifying means for filtering out the radio frequency output of said oscillator and for amplifying the sidebend frequencies from said mixer, and a mixer and amplifier for receiving said sidebands and the returning signal for producing a modulated Doppler signal.

10. A radar system as defined in claim 9 wherein said indicating means comprises a cathode ray indicator controlled from a synchronous detector supplied with the modulated Doppler signal from said mixer and amplifier and with a reference signal from said radio frequency source.

References Cited in the file of this patent

UNITED STATES PATENTS

| | | |
|---|---|---|
| 2,415,215 | Mayberry | Feb. 4, 1947 |
| 2,455,639 | Anderson | Dec. 7, 1948 |
| 2,465,113 | Norgaard | Mar. 22, 1949 |
| 2,479,209 | Chu | Aug. 16, 1949 |
| 2,492,012 | Smith | Dec. 20, 1949 |
| 2,611,125 | Dicke | Sept. 16, 1952 |
| 2,659,077 | Emslie | Nov. 10, 1953 |
| 2,743,438 | Page | Apr. 24, 1956 |
| 2,753,552 | Hom | July 3, 1956 |